United States Patent
Takemura et al.

(10) Patent No.: US 6,332,714 B1
(45) Date of Patent: Dec. 25, 2001

(54) INDUCTION-HARDENED ROLLING BEARING DEVICE

(75) Inventors: Hiromichi Takemura; Nobuaki Mitamura; Yasuo Murakami; Tomonobu Yoshikawa, all of Fujisawa; Shuhei Kitano; Kazuhiko Hiraoka, both of Himeji, all of (JP)

(73) Assignees: NSK Ltd., Tokyo; Sanyo Special Steel Co., Ltd., Himeji, both of (JP)

( * ) Notice: Subject to any disclaimer, the term of this patent is extended or adjusted under 35 U.S.C. 154(b) by 0 days.

(21) Appl. No.: 09/339,238

(22) Filed: Jun. 24, 1999

(30) Foreign Application Priority Data

Jun. 29, 1998 (JP) .................................. 10-182034

(51) Int. Cl.[7] .................................................. F16C 33/32
(52) U.S. Cl. ........................ 384/43; 384/492; 384/625; 384/913
(58) Field of Search ................. 384/45, 44, 43, 384/625, 492, 569, 912, 913

(56) References Cited

U.S. PATENT DOCUMENTS

| | | | |
|---|---|---|---|
| 4,593,957 | * 6/1986 | Hidano | 384/49 |
| 4,930,909 | * 6/1990 | Murakami et al. | 384/492 |
| 5,352,303 | * 10/1994 | Murakami et al. | 384/492 X |
| 5,542,991 | 8/1996 | Muraoka et al. | 148/330 |
| 5,618,114 | * 4/1997 | Katahira | 384/45 |
| 5,782,566 | * 7/1998 | Bertetti | 384/625 X |
| 5,860,749 | * 1/1999 | Hirakawa et al. | 384/492 |

FOREIGN PATENT DOCUMENTS

| | | |
|---|---|---|
| 0 487 250 | 5/1992 | (EP) . |
| 0 718 513 | 6/1996 | (EP) . |
| 5 59486 | 3/1993 | (JP) . |
| 6 57324 | 3/1994 | (JP) . |
| 6 341432 | 12/1994 | (JP) . |
| 11 51065 | 2/1999 | (JP) . |
| 11-71630 | 3/1999 | (JP) . |

* cited by examiner

*Primary Examiner*—Thomas R. Hannon
(74) *Attorney, Agent, or Firm*—Crowell & Moring LLP

(57) ABSTRACT

An induction-hardened rolling bearing device used by disposing rolling elements in a raceway track member, with excellent cold drawability and improved wear resistance and extended service life, in which ingredients of an alloy for the raceway track member contain, from 0.40 to 0.90% of C, from 0.05 to 0.80% of Si, from 0.10 to 2.0% of Mn, from 0.05 to 0.50% of Ti and 0.03% or less of N, on the weight basis, induction hardening is applied at least to the raceway surface of the raceway track member, and Ti carbide and Ti carbonitride each having an average particle diameter of from 5 to 100 nm are dispersed on the surface and in the steels of the raceway track member to make the hardness of the raceway surface to HRC 59 or more.

9 Claims, 5 Drawing Sheets

INDUCTION-HARDENED ROLLING BEARING DEVICE

BACKGROUND OF THE INVENTION

1. Field of the Invention

The present invention concerns a rolling bearing device typically represented by linear motion guide units, as well as rolling bearings, ball screws, water pump bearings, uniform speed joint races and hub unit bearings for use in automobiles and, more in particular, it relates to an induction-hardened rolling bearing device which is excellent in wear resistance, has long service life, as well as excellent in cold drawability and capable of extending the serving life of a die by induction hardening.

2. Statement of the Prior Art

Heretofore, a technique of applying induction hardening to parts made of carbon steels for use in mechanical structures, among all, medium carbon steels (C: 0.40 to 0.60%) as typically represented, for example, by automobile parts to increase the hardness only at the surface of them and improve static bending/twisting strength or rolling contact strength. For such application uses, steel materials such as JIS-S53C steels have been mainly used. For example, Japanese Patent Unexamined Publication Hei 6-57324 discloses a method of manufacturing an induction-hardened bearing for use in automobile hub units containing, as main ingredients, from 0.50 to 0.65% of C, from 0.07 to 0.15% of Si, from 0.05 to 0.35% of Mn, from 0.25 to 0.55% of Cr, and 0.0035% or less of B by weight ratio as a material for at least one of an outer ring and an inner ring as bearing parts to be applied with drilling fabrication.

Further, Japanese Patent Unexamined Publication Hei 5-59486 discloses, as another technique, steels used for cold forging, excellent in induction-hardenability and fatigue characteristic by forming a material containing from 0.4 to 0.6% of C, 0.1% or less of Si, from 0.2 to 0.4% of Mn, 0.015% or less of P, from 0.005 to 0.015% of S, from 0.20 to 0.50% of Cr, from 0.08 to 0.30% of Mo, from 0.0005 to 0.0030% of B, from 0.02 to 0.05% of Ti, from 0.01 to 0.05% of Al, 0.006% or less of N and 0.002% or less of O, in which the sum of Cr and Mo is from 0.30 to 0.80%.

Further, Japanese Patent Unexamined Publication Hei 6-341432 discloses a linear motion guide unit having a hardness Hv of a induction-hardened raceway track member of a guide rail increase to 700 or more and improved with wear resistance, without deteriorating the cold drawability by defining the composition of the steels as from 0.56 to 1.0% of C, 0.15% or less of Si, from 0.20 to 0.40% of Mn, from 0.30 to 0.70% of Cr and from 0.0005 to 0.0035% of B.

Generally, hardness of steel material after induction hardening and tempering becomes higher as the carbon content in the steel materials increases. In steel materials such as JIS-S53C described above, a hardness of about HRC 59 can be obtained as the surface hardness by properly controlling the heat treatment, but rolling fatigue resistant life and wear resistant characteristic are still insufficient. Further, there is also a problem that the cold workability of the steel material is lowered as the carbon content increases and this leads to the increase in the die cost in the cold drawing process. If the drawing speed is lowered with an aim of reducing the cost, the productivity is worsened.

For the bearing used for hub units disclosed in Japanese Patent Unexamined Publication Hei 6-57324, since the compositional range of ingredients in the alloy such as C, Si, Mn and Cr is defined, it has a remarkable advantage that the maximum value for the hardness Hv does not exceeds 230 even if the annealing step after hot forging is saved, so that drilling fabrication can be applied without deteriorating the tool, as well as that a hardness suitable to practical use can be ensured for raceway track members. However, a problem exists regarding the rolling fatigue characteristic. That is, as shown in FIG. 5, the rolling raceway surfaces 2 of an induction-hardened hub unit (cross-hatched portion) tend to suffer from abrasion or dints deleterious to bearing life, due to the lowering of a lubricant viscosity caused by intrusion of muddy water or obstacles, and there is still a room for improving such drawbacks.

Further, the steels for use in cold forging disclosed in Japanese Patent Unexamined Publication Hei 5-59486 are excellent in the hardenability but most of Ti merely added by from 0.02 to 0.05% is exhausted for fixing N required for incorporating B and no sufficient effect can be expected for the wear resistance. It rather gives rise to a problem of increasing the possibility for the presence of Ti system non-metal inclusions having a size of several tens of micrometers which are deleterious to the rolling fatigue life.

Further, the linear motion guide unit disclosed in the Japanese Patent Unexamined Publication Hei 6-341432 is satisfactory regarding the cold drawability and also has satisfactory rolling fatigue characteristic compared with conventional steels. However, while the wear resistance under the current working circumstances is sufficient, there is still a room for the improvement regarding the rolling fatigue characteristic and the wear resistant characteristic when working circumstances are worsened in the feature.

OBJECT OF THE INVENTION

The present invention has been accomplished for overcoming the foregoing problems not yet solved and it is an object of the invention to provide an induction-hardened rolling bearing device, excellent in a cold drawability, having a long service life and high wear resistance, by dispersing particles of Ti carbide and Ti carbonitride into the steel material and applying induction hardening.

SUMMARY OF THE INVENTION

The foregoing object can be attained in accordance with the present invention by a rolling bearing device having rolling elements disposed to and rolling in raceway track members, wherein ingredients of an alloy for at least one of the raceway track members contain from 0.40 to 0.90% of C, from 0.05 to 0.80% of Si, from 0.10 to 2.0% of Mn, from 0.05 to 0.50% of Ti and 0.03% or less of N, induction-hardening is applied at least to a raceway surface of the raceway track member, and Ti carbide or Ti carbonitride each having an average particle diameter of from 5 to 100 nm are dispersed at the surface and in the steel of the raceway track member, to make the hardness on the raceway surface to HRC 59 or higher.

In a preferred embodiment of the induction-hardened rolling bearing device according to the present invention described above, the ingredients of the alloy for at least one of the raceway track members at least contain one of from 0.05 to 2.0% of Cr, from 0.03 to 1.5% of Mo and from 0.03 to 3.0% of Ni.

In a preferred embodiment of the induction-hardened rolling bearing device described above, the compositional ingredients of the alloy for the raceway track member further contain preferably from 0.0005 to 0.005% of B.

In a preferred embodiment of the invention, Ti carbide and Ti carbonitride each of an average particle diameter of from 5 to 100 nm are dispersed by the number of 100 or more per 1 $\mu m^2$ to the raceway surface of the raceway track member.

In a preferred embodiment of the invention, the rolling bearing device comprises a linear motion guide unit and the raceway track member comprises a guide rail and a bearing box.

In a preferred embodiment of the invention, the surface hardness for the raceway surface of the rolling bearing device is HRC 59 to 65, and the hardness for the portion undergoing subsequent machining is HRB 98 or less.

PREFERRED EMBODIMENTS OF THE INVENTION

Preferred embodiments of the present invention are to be explained below.

The rolling bearing device of the present invention include those devices comprising a raceway track member having a raceway surface on which rolling elements roll and a plurality of balls or rolls as rolling elements and adapted to conduct linear motion or rotational motion, particularly, those rolling bearing devices typically represented, for example, by the linear motion guide units, various types of ball bearings or roller bearings, ball screws, water pump bearings, uniform speed joint and bearings for use in automobile hub units described above, which are used by applying induction hardening to at least the raceway surface of the raceway track member.

The present invention intends to further improve the rolling fatigue life, the wear resistance and the cold drawability for the parts constituting the raceway surface of the rolling bearing devices raceway track members as constitutional parts in the rolling bearing devices particularly tending to suffer from injuries and giving a significant effect on the service life (such as guide rails and bearing box for linear motion guide units, bearing rings of rolling bearings, and screw shafts and nuts for ball screws), thereby providing an induction-hardened rolling bearing device of excellent workability and having long service life.

At first, a reason of defining the ingredients of the alloy in the rolling bearing device according to the present invention is to be explained.

C: 0.40–0.90%

C is an element providing required hardness for a rolling bearing device. If it is less than 0.40%, a required hardness of HRC 59 or higher can not sometimes be obtained for the raceway surface after induction hardening and tempering. On the other hand, if it is incorporated in excess of 0.90%, the cold workability is worsened. Therefore, the C content is defined as from 0.40 to 0.90%.

Si: 0.05–0.80%

Si is an element of improving the hardenability with an aim for the delay of structural changes in rolling fatigue. A deoxidation effect is not sufficient if it is less than 0.05%, whereas the cold workability is remarkably worsened if it exceeds 0.80%, so that the Si content is defined as from 0.05 to 0.80%.

Mn: 0.10–2.0%

Mn is an element effective to the steel hardenability. The hardenability is insufficient if it is less than 0.10%, whereas the cold workability is deteriorated if it exceeds 2.0%, so that the Mn content is defined as from 0.10 to 2.0%.

Ti: 0.05–0.50%

Ti is an element for improving the wear resistance and rolling life by being finely dispersed in the form of Ti carbide (TiC) and Ti carbonitride (TiCN) into the steels, and for suppressing growing of crystal grains during hardening. However, if it is less than 0.05%, it is mainly formed into Ti nitride (TiN) to give only small effect due to fine TiC or TiCN. On the other hand, if it exceeds 0.50%, the cold workability is worsened and it tends to form TiN as inclusions for deteriorating the rolling life, so that the Ti content is defined as from 0.05 to 0.50%.

N: 0.03% or less

N is bonded with Ti to form Ti carbide and Ti carbonitride and has a function of remarkably improving the rolling life by dispersion-reinforcing effect of the fine dispersion. However, as the amount of N increases, formation of Ti nitride having a large particle diameter is increased and N is consumed for such formation to decrease the amount of Ti carbide and Ti carbonitride. Therefore, the N content is defined as 0.03% or less.

Cr: 0.05–2.0%

Cr is an element for improving the hardenability like that Mn and promoting spheroidization of carbides and it has to be incorporated at least by 0.05% or more. However, if it is contained in excess of 2.0%, carbides become coarser to sometimes worsen the cold workability and deteriorate the machinability, so that the Cr content is defined as from 0.05 to 2.0%.

Mo: 0.03–1.5%, Ni: 0.03–3.0%

Both of Mo and Ni are elements effective to the improvement of the toughness and the rolling fatigue characteristic. However, since no such effect can be obtained if they are insufficient and the effects are saturated if they are excessive, the optimum amount are defined as from 0.03 to 1.5% for Mo and from 0.03 to 3.0% for Ni.

B: 0.0005–0.005%

Further, B is an element for improving the hardenability. Since the effect is not sufficient if it is less than 0.0005% whereas the hardening effect is saturated if it exceeds 0.005%, the upper limit is preferably defined as 0.005%.

P: 0.02% or less, S: 0.02% or less, O: 0.0016%

Since P is an element for lowering the rolling life and the toughness, the upper limit is defined as 0.02%. S is an element of improving the machinability but it is combined with Mn to form sulfide inclusions that deteriorate the rolling life, so that the upper limit is defined as 0.02%. Since O is an element of forming oxide series inclusions in the steel to lower the rolling service life, its upper limit is defined as 0.0016%.

In the induction-hardened rolling bearing device according to the present invention, the ingredients of the alloy for the bearing steel, for example, of a bearing inner ring as a track member is defined to contain, at least, from 0.40 to 0.90% of C, from 0.05 to 0.80% of Si, from 0.10 to 2.0% of Mn, from 0.05 to 0.50% of Ti and 0.03% or less of N, based on the ingredients of the alloy described above. Then, fine Ti carbide and Ti carbonitride having an average particle diameter of from 5 to 100 nm are dispersed at the surface of the alloy and in the steel of the inner ring. In this case, it is preferred for the Ti carbide (TiC) having the average particle diameter of from 5 to 100 nm that the number of Ti carbide to be dispersed is 100 or more per 1 $\mu m^2$ (0.20 $\mu m^2 \times 5$ view fields).

BRIEF DESCRIPTION OF THE ACCOMPANYING DRAWINGS

DESCRIPTION OF THE PREFERRED EMBODIMENTS

Then, the present invention is to be explained more concretely based on comparison tests conducted for examples of the present invention and comparative examples.

Figure 1:
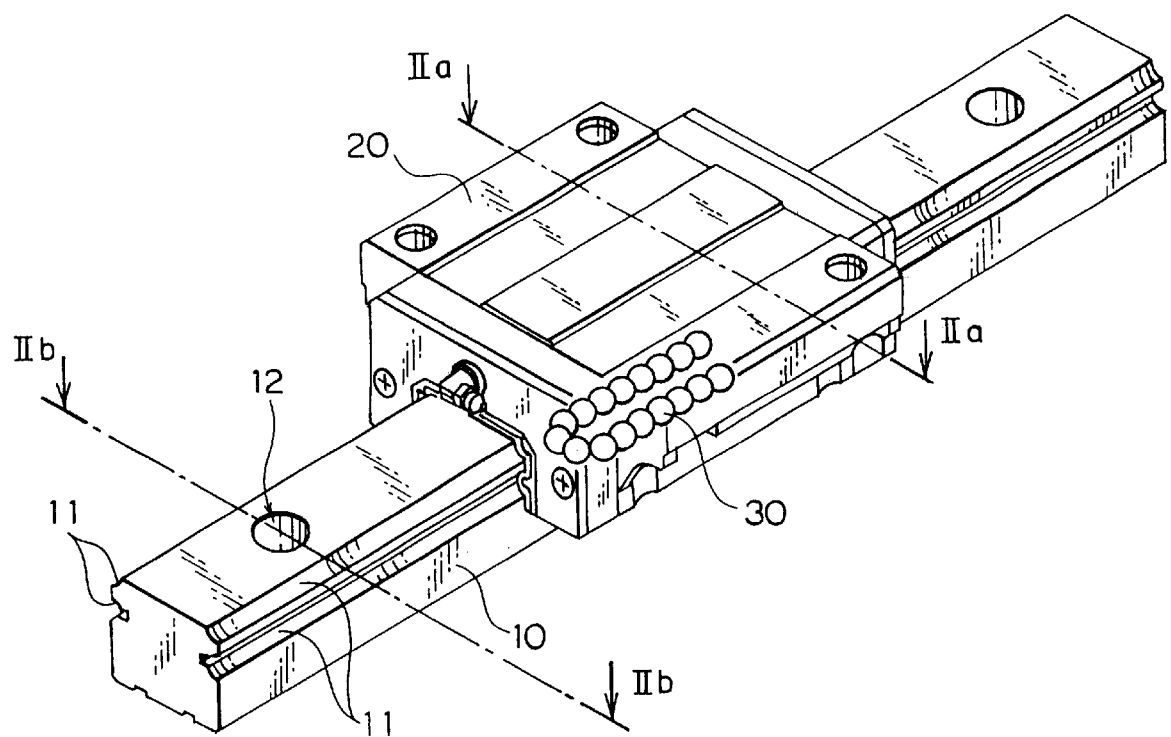
FIG. 1 is a partially cutaway perspectaive view of a direct motion guide bearing used for a wearing test.
Figure 2A:
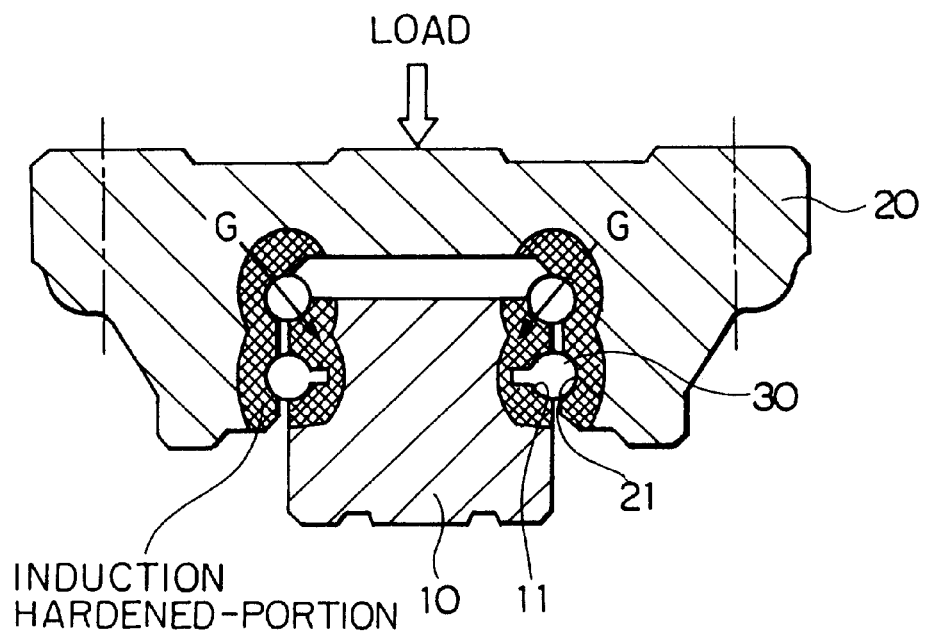
FIGS. 2(*a* and *b*) is a cross sectional view taken along line IIa—IIa and a cross sectional view taken along line IIb—IIb in FIG. 1 showing the outline of a induction-hardened portion formed to the constituent member of the direct motion guide bearing.

As a rolling bearing device for a test specimen, a linear motion guide unit as shown in FIG. 1 and FIG. 2 was chosen.

The bearing comprises a guide rail 10 as a raceway track member having raceway grooves (also referred to as raceway surfaces) 11 rolling grooves of rolling bearing devices at both lateral surfaces, and a bearing 20 fitted thereto, which substantially of a U-shaped cross sectional shape and has raceway grooves 21 formed at the inner surface of a sleeve portion thereof being opposed to the raceway grooves 11, and which is adapted to conduct a relative linear motion by way of rolling of a plurality of rolling bearing devices (steel balls) 30 circulated in the bearing 20 while rolling along both of the raceway grooves 11 and 21 opposed to each other.

The guide rail 10 and the bearing box 20 of the linear motion guide unit were manufactured trially using steel materials having the alloy compositions shown in Table 1. The workability in the manufacture, and the wear resistance and the rolling fatigue characteristic of the assembled linear motion guide unit were examined in comparison.

The alloy compositions for Examples 1–10 and Comparative Examples 1–9 are as shown in Table 1.

TABLE 1

|  |  | C | Si | Mn | Ti | N | Cr | Mo | Ni | (%) |
|---|---|---|---|---|---|---|---|---|---|---|
| Example | 1 | 0.40 | 0.21 | 0.40 | 0.051 | 0.002 | 0.05 | — | — | |
|  | 2 | 0.56 | 0.43 | 0.28 | 0.249 | 0.001 | 0.64 | — | — | |
|  | 3 | 0.61 | 0.21 | 0.21 | 0.203 | 0.029 | 0.34 | — | — | |
|  | 4 | 0.66 | 0.12 | 0.63 | 0.184 | 0.001 | 0.02 | 1.5 | — | |
|  | 5 | 0.71 | 0.05 | 0.41 | 0.492 | 0.023 | 0.37 | — | — | |
|  | 6 | 0.64 | 0.09 | 0.29 | 0.161 | 0.002 | 0.21 | — | — | |
|  | 7 | 0.75 | 0.14 | 0.11 | 0.347 | 0.006 | 0.98 | — | — | |
|  | 8 | 0.78 | 0.80 | 0.45 | 0.244 | 0.001 | 0.04 | — | 0.05 | |
|  | 9 | 0.84 | 0.21 | 0.19 | 0.157 | 0.002 | 2.00 | 0.7 | 1.6 | |
|  | 10 | 0.90 | 0.26 | 2.0 | 0.078 | 0.016 | 0.05 | 0.03 | 3.0 | |
| Comp. Example | 1 | 0.53 | 0.26 | 0.78 | 0.003 | 0.001 | 0.27 | — | — | S53C |
|  | 2 | 0.35 | 0.24 | 0.64 | 0.107 | 0.002 | 0.20 | — | — | S35C |
|  | 3 | 0.56 | 0.01 | 0.41 | 0.091 | 0.001 | 0.24 | — | — | |
|  | 4 | 0.49 | 0.27 | 0.05 | 0.123 | 0.001 | 0.19 | — | — | |
|  | 5 | 0.68 | 1.38 | 0.24 | 0.072 | 0.004 | 0.25 | 0.1 | — | |
|  | 6 | 0.71 | 0.34 | 2.39 | 0.158 | 0.015 | 0.31 | — | — | |
|  | 7 | 0.61 | 0.21 | 0.63 | 0.680 | 0.001 | 0.33 | — | 0.1 | |
|  | 8 | 1.08 | 0.24 | 0.41 | 0.129 | 0.004 | 0.15 | — | — | SUJ2 |
|  | 9 | 0.85 | 0.23 | 0.45 | 0.110 | 0.001 | 0.24 | — | — | Bath Hardening |

(A) Workability Test

Guide rails 10 of linear motion guide units were manufactured from a specimen materials having alloy compositions shown in Table 1. A solution treatment was applied at 1150 to 1350° C. to the specimen materials for solubilizing Ti into the matrix and then normalization was applied at 850 to 1050° C. and TiC was finely dispersed and deposited by way of spheroidizing annealing. The size and the amount of particles such as of TiC and TiCN (dispersed state) are determined by applying the solution treatment to the starting materials.

Then, using the starting materials for test made of specimen materials having each of the compositions of Examples 1–10 and Comparative Examples 1–9 (polished steel bars each of 40 mm diameter×5 m length), cold drawing was applied under the identical conditions by the following procedures. Comparative Example 1 corresponded to JIS- S53C and Comparative Example 2 corresponded to S35C. The cold drawing was conducted by repeating a series of four steps of (1) swaging (passing the top end of the material through a hole of a dies), (2) annealing at low temperature, (3) forming a lubricant layer on the surface of the starting material (phosphate layer+metal soap layer) and (4) drawing the starting material, by using super-hard alloy dies for use in primary drawing respectively, intermediate drawing and finish drawing. Thus, as shown in FIG. 3, a starting material (a) of an elliptic cross sectional shape was finished by way of each cross sections (b) and (c) into a rail having ball grooves of a predetermined shape (d). Then, the service life of the dies was compared for each of the materials. In the case of the guide rail of the linear motion guide unit, since the cross section is formed by cold drawing, evaluation for the cold workability of the alloy materials is particularly important.

That is, in the finishing step conducted at a severe dimensional accuracy, after the steel bars were drawn in the dies by the number of 1000, the shape of products was measured on every 50 pieces, and the number of treated products was examined when the dimensional accuracy of the ball grooves became not acceptable due to the abrasion at the inner surface of the dies. Then, the life ratio was calculated on the basis for the life of Comparative Example 1 capable of treating 2000 pieces. The result is shown in Table 2.

compositions, so that the dies life was shorter and the cold drawing characteristic was poor compared with those of Comparative Example 1.

(B-1) Hardenability

Induction hardening (progressive hardening) and tempering (at 150–180° C.) were applied under the following conditions to each of the guide rails 10 applied with the cold drawing as described above at two opposing lateral surfaces in which the ball grooves 11 are formed (rolling raceway surface). The surface hardness HRC of 59 or higher could be attained for the raceway surface 11 of the guide rail 10 by the induction hardening. In Comparative Example 9, conventional bath hardening at 840° C. was conducted instead of induction hardening and then tempering was conducted at 160° C. By the way, the guide rail applied with conventional bath hardening caused large bending to require leveling in the subsequent step and require additional number of polishing.

Hardening Condition

Frequency: 30 kHz

Current: 10 A

Cooling water flowrate: 35 l/min

Voltage; 10 kV

Feed rate: 8 mm/sec

After the heat treatment, surface hardness (HRC) was measured at the raceway surface of the rail (ball grooves 11 in FIG. 2) for each guide rail 10. The measurement was

TABLE 2

|  |  | Average particle diameter (nm) for Tic, TiCN | Surface hardness ($H_{RC}$) after induction hardening | Hardness ($H_{RB}$) other than raceway surface | Die life ratio | Ratio of average abrasion depth of groove (based on Comp. Example 1) | Repeating number for rolling fatigue life ($L_{10}$: ×10$^6$) | Tool life | |
|---|---|---|---|---|---|---|---|---|---|
|  |  |  |  |  |  |  |  | Number of holes | Life ratio |
| Example | 1 | 21 | 61 | 73 | 1.02 | 0.5 | 4.86 | 1200 | 2.4 |
|  | 2 | 38 | 59 | 78 | 1.15 | 0.5 | 4.41 | 1550 | 3.1 |
|  | 3 | 14 | 62 | 80 | 1 | 0.5 | 5.66 | 1050 | 2.1 |
|  | 4 | 5 | 63 | 86 | 1.04 | 0.4 | 7.89 | 1350 | 2.7 |
|  | 5 | 98 | 62 | 87 | 1.11 | 0.7 | 1.45 | 1450 | 2.9 |
|  | 6 | 24 | 63 | 81 | 1.09 | 0.5 | 4.99 | 1400 | 2.8 |
|  | 7 | 47 | 61 | 84 | 1.15 | 0.5 | 4.01 | 1650 | 3.3 |
|  | 8 | 64 | 60 | 95 | 1.24 | 0.7 | 1.56 | 1950 | 3.9 |
|  | 9 | 7 | 65 | 93 | 1.19 | 0.4 | 6.84 | 1700 | 3.4 |
|  | 10 | 10 | 60 | 98 | 1.08 | 0.5 | 6.77 | 1400 | 2.8 |
| Comp. Example | 1 | 527 | 59 | 105 | 1 | 1 | 0.14 | 500 | 1 |
|  | 2 | 34 | 55 | 85 | 1.20 | 1.3 | 0.09 | 850 | 1.7 |
|  | 3 | 15 | 57 | 74 | 1.15 | 0.8 | 0.35 | 950 | 1.9 |
|  | 4 | 9 | 57 | 81 | 1.03 | 0.9 | 0.41 | 900 | 1.8 |
|  | 5 | 21 | 62 | 89 | 0.64 | 0.9 | 0.91 | 200 | 0.4 |
|  | 6 | 18 | 63 | 92 | 0.59 | 0.9 | 0.98 | 250 | 0.5 |
|  | 7 | 478 | 61 | 96 | 1 | 1.2 | 0.18 | 600 | 0.4 |
|  | 8 | 24 | 65 | 98 | 0.38 | 0.9 | 0.16 | 150 | 0.4 |
|  | 9 | 98 | 60 | 60*[1] | 0.45 | 0.7 | 1.40 | 200 | 0.3 |

*[1] was measured by the Rockwell hardness C scale.

As can be seen from the results of Table 2, in Examples 1–10, the dies life ratio was greater than the value in Comparative Example 1 (corresponding to JIS-S53C steel used conventionally), and the cold drawing characteristic was equal with or superior to those of the prior art. Further, while Comparative Examples 2, 3, 4 and 7 were satisfactory compared with Comparative Example 1, the steel materials of Comparative Examples 5, 6, 8 and 9 which were out of the range of the present invention contained excessive amount of C or excessive amount of other alloy conducted as shown in by arrows G in FIG. 2, from the surface to the inside. The Rockwell hardness as the measured value was also shown in Table 2. In Examples 1–10, lowering of hardness HRC to 59 or less was not recognized as far as 10 m depth and it was satisfactory under the induction hardening conditions.

(B-2) Hardness of Hot Induction Hardened Surface (surface other than raceway surface)

Further, in each of cold drawn guide rails 10, the hardness was measured at the cross section for the surface other than the surface to which the ball groove 11. The result is shown in Table 2. The hardness is lower in each of Examples 1–10 and Comparative Examples 1–8, compared with the hardness for the surface of the induction-hardened ball groove 11. For the measurement of the hardness, a Rockwell hardness B scale (HRB, 100 kgf load, 1/16 inch dia ball) was used. In Comparative Example 9, since the entire guide rail 10 was subjected to bath hardening, the hardness for the portion of the ball groove 11 and the hardness for the portion other than the raceway surface showed identical value.

(B-3) Drilling Workability Test

Figure 2B:
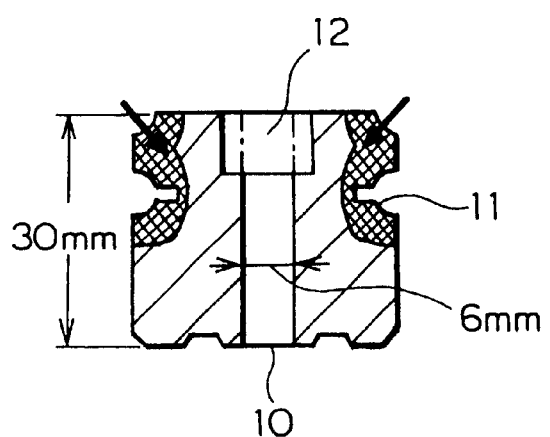
Figure 3A:
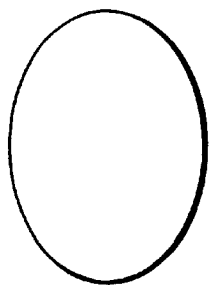
FIGS. 3(*a* –*d*) is a cross sectional view showing the change of a drawn shape during cold drawing for the starting material in a comparison test.
Figure 3B:
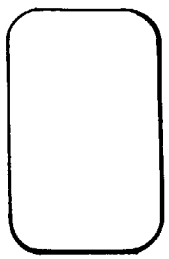
Figure 3C:
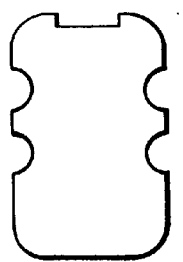
Figure 3D:
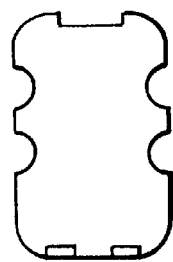

A cold drawn guide rail 10 subjected to annealing and then induction hardening only for the portion of the ball groove 11 was applied with drilling fabrication for forming bolt holes 12 to a portion other than the ball groove 11 as shown in FIG. 2(b), and the working life machining tools used in the test was compared. Induction hardening can also be applied directly with no annealing after the cold drawing for the guide rail 10.

Drilling conditions by high speed steel tools are as follow.
Tool; corresponding to SKH56, 6.0 D, TiN coated
Cutting speed; 20 m/min
Feed rate; 0.1 mm/rev
Lubricant; water insoluble cutting oil The working life of the drilling tools was judged based on the number of drilling cycles till wearing occurred to a cutting blade. The high speed steel drills were observed on every 50 cycles of drilling after reaching 200 cycles of drilling. The result is shown in Table 2.

As a result of the test, the tool life was improved in Examples 1–10 by 2.1 times or more compared with Comparative Example 1 (conventional example) and long life could be attained. This is considered that finely dispersed and deposited TiC and TiCN formed a thin Ti coating layer on the surface of the tool in the cutting process between TiN on the tool surface and the matrix, to improve the working life of the tool. Further, the working life was also improved since Ti-added steel materials are easily softened after drawing fabrication to facilitate machining.

On the other hand, in Comparative Examples 2, 3 and 4, the tool life was extended compared with Comparative Example 1, but it was shorter than that in the examples since the addition amount of C, Si and Mn was insufficient.

Further, in Comparative Examples 5, 6, 7 and 8, since the addition amount of C, Si and Mn and Ti was excessive, cutting property was poor to cause plucking or the like and cutting resistance was increased in spite of the low hardness of the matrix and, as a result, the tool life was reduced to 1 or less.

Further, in Comparative Example 9, although the amount of alloying elements was sufficient, the hardness of the matrix was HRC 60 because the material was subjected to bath hardening and, as a result, the tool life was reduced most.

Generally, in raceway track members such as guide rails for linear motion guide units (linear guides) or screw shaft of ball screws, it is necessary to at first apply induction hardening to the raceway surface and then applying fabrication to attaching portions (bolt holes) or shaft end attaching portion. This is because induction hardening for the raceway surface may cause axial bending or twisting exceeding a tolerable level, in which accuracy (size, pitch or the like) is worsened unless final fabrication is applied to the attaching portion after correcting the bending.

Figure 5:
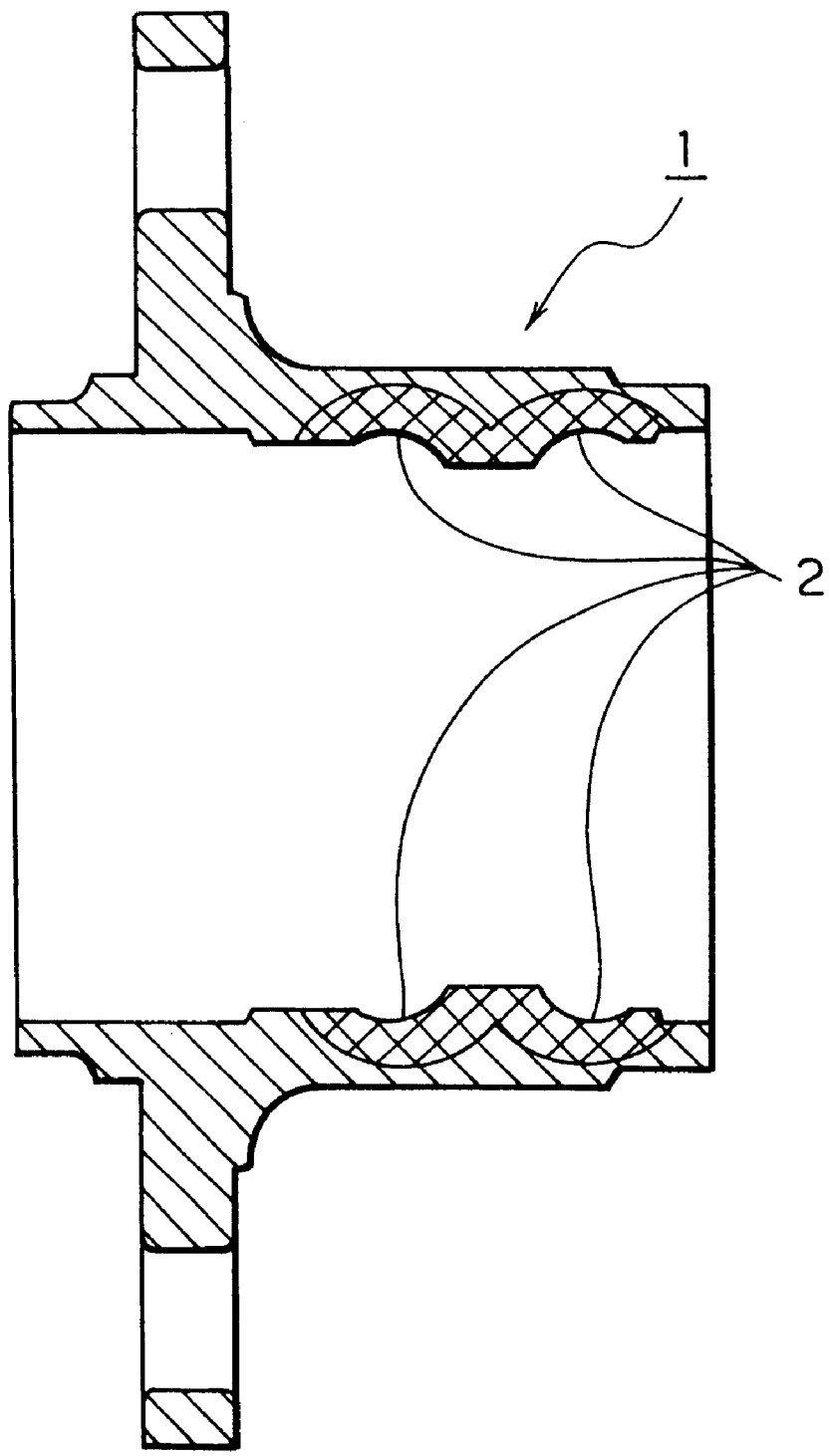
FIG. 5 is a cross sectional view of a induction-hardened bearing for use in a hub unit.

Further, also in the outer ring of a hub unit bearing shown in FIG. 5, it is necessary to fabricate an attaching flange hole after removing warp of the flange after applying induction hardening to the raceway surface.

That is, the parts described above, as examples, require cold drawing (or hot forging)→annealing→induction hardening for raceway surface→machining such as drilling.

Therefore, in the present invention, (i) the surface hardness of the raceway surface is defined as HRC 59–65 by induction hardening, and (ii) hardness for the portion other than the raceway surface to be applied with machining is defined as HRB 73–98.

Regarding (i) above, the rolling fatigue life is lowered if HRC is 50 or less and, on the other hand, the raceway surface tends to cause cracks easily undergoing external force (bending strength in axial direction, longitudinal direction or the like) if it exceeds HRC 65.

Regarding (ii) above, the lower limit of HRB 73 is the lowest hardness when the material undergoes no heat effect. Generally, the value is desirably as low as possible. If it exceeds HRB 98, the tool life is shortened.

(C) Wear Resistance Test

Figure 4A:
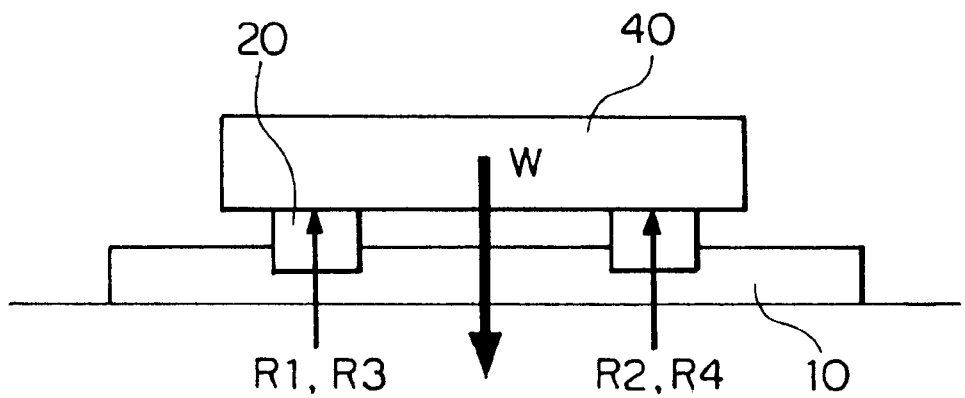
FIG. 4(*a*) is a side elevational view of a direct motion guide bearing for explaining the method of applying load in a wearing test and FIG. 4(*b*) is a bottom view thereof.
Figure 4B:
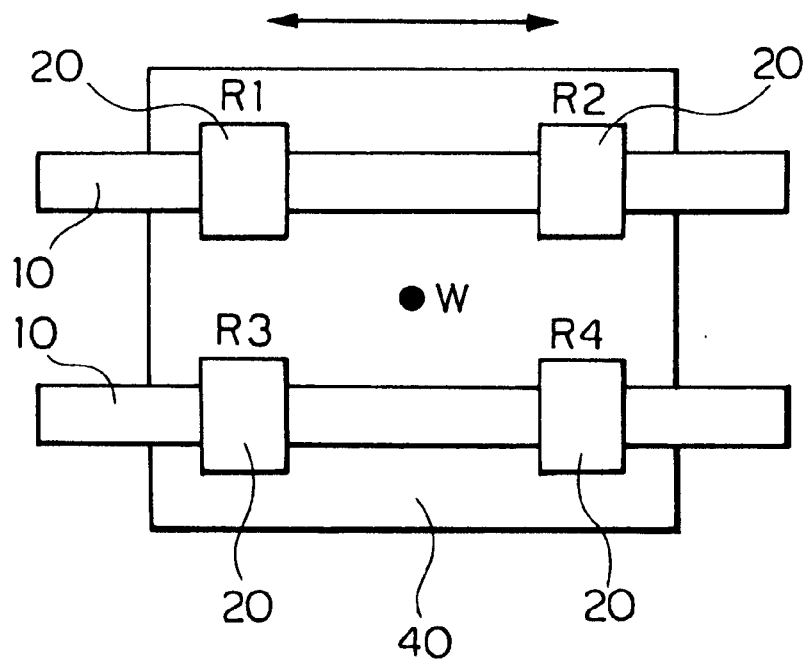

Using the guide rails 10 and the bearing boxes 20 manufactured from each of the steels in Examples 1–10 and Comparative Examples 1–9 as described above, each of linear motion guide units as shown in FIG. 1 was assembled, and an evaluation test for the wear resistance was conducted for each three bearings under the following test conditions. That is, as shown in FIG. 4, two guide rails 10 each having two bearings 20 were arranged in parallel, on which a table 40 was placed such that four bearing boxes 20 were disposed at four corners of the table 40 and a load W was applied from above at the center of the table 40 and the table 40 was reciprocated in a state where identical reaction R1=R2=R3=R4 was caused to each of the bearing boxes 20 was formed.

Wearing Test Condition
  Rail length: 1.51 m
  Load applied: 655 kgf/bearing
  Average test speed: 24 m/min
  Lubrication: grease lubrication (Albania No. 2)
  Reciprocating distance: 400 mm After the total running distance of the reciprocal movement reached 6400 km, an average abrasion depth of the raceway grooves 11 was measured for each of the guide rails 10 and an average abrasion depth ratio was calculated based on the average abrasion depth of Comparative Example 1 as a reference. As a result, as shown in Table 2, the average abrasion depth ratio in each of Examples 1–10 and Comparative Examples 3–6, 8 and 9 showed more preferred wear resistance compared with Comparative Example 1. This is considered to be attributable to the effect by the finely deposited TiC. However, Comparative Example 5, 6, 8 and 9 were poor in the die life as described above. Further, Comparative Examples 3 and 4 were poor in the hardenability and showed values for the surface hardness HRC as low as 57. From the results described above, it is apparent that the steels of the compositions in Examples 1–10 are excellent in the cold drawing characteristics, capable of providing a hardness exceeding HRC 59 to the surface layer of the steels by induction-hardening, excellent in the wear resistance when used as a rail for the direct motion guide bearing, as well as can provide a material capable of increasing the die life and attaining high productivity.

(D) Rolling Fatigue Test under Inclusion of Obstacles

Muddy water or obstacles intrude the rolling raceway surface applied with induced heat treatment such as of a bearing for use in a hub unit to give a significant effect of shortening the rolling life. In view of the above, a comparison test for the rolling (contact) fatigue was conducted as outlined below. That is, thrust life test pieces each of 60 mm diameter were manufactured by using steel materials of the examples and the comparative examples shown in Table 1 and applying induced-hardening and tempering treatment under the same conditions as described above. The test specimen of Comparative Example 11 was manufactured by applying hardening being heated at 840° C. and tempered at 160° C. Steel balls formed by applying a usual heat treatment to SUJ2 was used as the steel ball, the service life till the thrust life test piece (thrust TP) was peeled under the following conditions was arranged with respect to the accumulative fracture ratio and evaluated by determining the $L_{10}$ life (life at 10% accumulate fracture ratio). Ten specimens were used for the test.

Condition for Rolling Contact Fatigue Test under Intrusion of Obstacles

Maximum hertz stress: 500 kgf/mm$^2$

Number of rotation for test: 1000 rpm

Lubricant oil: #68 turbine oil for oil bath

Obstacles intruded: sized 74 to 147 $\mu$m, hardness Hv 870

Concentration: 300 ppm

The results are shown together in Table 2. As shown in Table 2, specimen in each of Examples 1–10 had a longer life at least about 10 times of the specimen of Comparative Example 1 (conventional example) and Comparative Example 7 and this is considered to be attributable to the dispersion-reinforcement by TiC and the surface hardness.

In Comparative Example 2, fine TiC was deposited but the rolling life was shorter compared with Comparative Example 1 since the surface hardness was HRC 55 or less. In Comparative Examples 3 and 4, while the life was longer than Comparative Example 1 by the deposition effect of fine TiC but no sufficient life was obtained since the hardenability was lowered and the surface hardness HRC was 57. Further, in Comparative Examples 5 and 6, fine TiC was deposited and the service life was extended outstandingly compared with Comparative Examples 1–4, but a room for improvement is still considered to be exist compared with examples. Further, in Comparative Example 8, while fine TiC was recognized, huge Cr system carbides were also recognized and it is considered that they led to the lowering of the rolling fatigue life. In Comparative Example 9, TiC of 98 nm particle diameter was finely deposited and the rolling fatigue life was at the same level as the examples, but it is considered that further refinement of TiC may be restricted in the conventional heat treatment other than the hardening by induced-heating. Furthermore, in view of the cold workability, it tends to be worsened remarkably compared with Examples 1–10.

Accordingly, judging from the results for each of the working life ratio of the die, the wear resistance test (C) and the rolling fatigue test (D) under intrusion of obstacles, it is estimated that TiC and TiCN serve as hindering walls at the grain boundaries to prevent secondary slip of dislocations in this embodiment by finely dispersing Ti carbide and Ti carbonitride of an average particle diameter of 50 to 100 nm into steels applied with induction hardening without deteriorating the cold workability and, as a result, the wear resistance is improved, dents are less formed to the raceway surface and the rolling fatigue resistant characteristic is also improved.

As apparent from the foregoing explanations, according to the present invention, since Ti carbide and Ti carbonitride having an average particle diameter from 5 to 100 nm are finely dispersed at the surface and in the steels of the raceway member by adding from 0.05 to 0.50% of Ti to a bearing steel to be applied with induction-hardening, it is possible to improve the wear resistant characteristic and suppress dents on the raceway surface even when obstacles are intruded, to thereby extend the rolling life.

What is claimed is:

1. An induction-hardened rolling bearing device having rolling elements disposed to and rolling in raceway track members, in which ingredients of an alloy for at least one of the raceway track members contains from 0.40 to 0.90% of C, from 0.05 to 0.80% of Si, from 0.10 to 2.0% of Mn, from 0.05 to 0.50% of Ti and 0.03% or less of N, on the weight basis, induction hardening is applied at least to the raceway surface of the raceway track member, and Ti carbide or Ti carbonitride each having an average particle diameter of from 5 to 100 nm are dispersed on the surface and in the raceway track member to make the hardness of the raceway surface to HRC 59 or more.

2. An induction-hardened rolling bearing device having rolling elements disposed to and rolling in raceway track members, in which ingredients of an alloy for at least one of the raceway track members are as defined in claim 1, and contains at least one of ingredients of from 0.05 to 2.0% of Cr, from 0.03 to 1.5% of Mo and from 0.03 to 3.0% of Ni on the weight basis.

3. An induction-hardened rolling bearing device having rolling elements disposed to and rolling in raceway track members, in which ingredients of an alloy for at least one of the raceway track members are as defined in claim 1 or 2 and contains from 0.0005 to 0.005% of B on the weight basis.

4. An induction-hardened rolling bearing device as defined in any one of claims 1 to 2, wherein Ti carbide and Ti carbonitride each having an average particle diameter of from 5 to 100 nm are dispersed by the number of 100 or more per 1 $\mu$m$^2$ at the raceway surface of the raceway track member.

5. An induction-hardened rolling bearing device as defined in claim 4, wherein the rolling bearing device comprises a linear motion guide unit and the raceway trace member comprises a guide rail and a bearing box.

6. An induction-hardened rolling bearing device as defined in any one of claims 1 to 2, wherein the rolling bearing device comprises a linear motion guide unit and the raceway track member comprises a guide rail and a bearing box.

7. An induction-hardened rolling bearing device as defined in claim 6, wherein the surface hardness for the raceway surface of the rolling bearing device is HRC 59 to 65, and the hardness for the portion undergoing subsequent machining is HRB 98 or less.

8. An induction-hardened rolling bearing device as defined in any one of claims 1 to 2, wherein the surface hardness for the raceway surface of the rolling bearing device is HRC 59 to 65, and the hardness for the portion undergoing subsequent machining is HRB 98 or less.

9. An induction-hardened rolling bearing device as defined in claim 8, wherein the surface hardness for the raceway surface of the rolling bearing device is HRC 59 to 65, and the hardness for the portion undergoing subsequent machining is HRB 98 or less.

* * * * *